(12) United States Patent
Park (10) Patent No.: US 9,902,420 B2
(45) Date of Patent: Feb. 27, 2018

(54) STEERING APPARATUS FOR AUTOMOBILE (71) Applicant: HYUNDAI MOBIS Co., Ltd., Yongin-si, Gyeonggi-do (KR)

(72) Inventor: Han Jin Park, Yongin-si (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/095,468

(22) Filed: Apr. 11, 2016

(65) Prior Publication Data

US 2016/0339953 A1 Nov. 24, 2016

(30) Foreign Application Priority Data

May 22, 2015 (KR) .................. 10-2015-0071632

(51) Int. Cl.
*B62D 3/12* (2006.01)
*B62D 21/11* (2006.01)
*B62D 7/15* (2006.01)
*B62D 17/00* (2006.01)

(52) U.S. Cl.
CPC .............. *B62D 3/12* (2013.01); *B62D 7/1581* (2013.01); *B62D 17/00* (2013.01); *B62D 21/11* (2013.01)

(58) Field of Classification Search
CPC .......... B62D 3/12; B62D 21/09; B62D 21/11; B60G 7/008; B60G 7/02; F16B 43/00
USPC .................................................. 411/338, 546
See application file for complete search history.

(56) References Cited

U.S. PATENT DOCUMENTS

| | | | | |
|---|---|---|---|---|
| 4,720,075 A * | 1/1988 | Peterson | ............... | F16F 3/0873 248/634 |
| 5,385,369 A * | 1/1995 | Mukai | ............... | B60G 3/24 280/788 |
| 5,601,304 A * | 2/1997 | Tilly | ............... | B60G 3/06 280/124.15 |
| 6,095,481 A * | 8/2000 | Norkus | ............... | B60G 99/004 248/560 |
| 6,149,197 A * | 11/2000 | Ishii | ............... | B60G 7/02 280/784 |
| 6,783,157 B2 * | 8/2004 | Huang | ............... | B60G 7/02 280/124.109 |
| 6,929,272 B2 * | 8/2005 | Matsumoto | ............... | B62D 21/11 280/124.109 |
| 7,017,926 B2 * | 3/2006 | Lee | ............... | B60G 7/02 280/124.134 |
| 7,258,354 B2 * | 8/2007 | Kim | ............... | B62D 21/11 280/124.109 |

(Continued)

FOREIGN PATENT DOCUMENTS

| | | | | |
|---|---|---|---|---|
| JP | 02283577 A | * | 11/1990 | ............ B62D 21/11 |
| JP | 2000343921 A | * | 12/2000 | |
| JP | 2010013037 A | * | 1/2010 | |

*Primary Examiner* — Laura Freedman
(74) *Attorney, Agent, or Firm* — Paratus Law Group, PLLC (57) ABSTRACT A steering apparatus for an automobile according to the exemplary embodiment of the present invention includes: a steering housing in which a steering drive unit, which moves a left tie rod and a right tie rod to the left and right sides, is disposed; a left mounting bracket which is coupled to a left side of the steering housing and coupled to a left lower arm; and a right mounting bracket which is coupled to a right side of the steering housing and coupled to a right lower arm.

11 Claims, 12 Drawing Sheets

(56) References Cited

U.S. PATENT DOCUMENTS

| | | | |
|---|---|---|---|
| 7,976,037 B2* | 7/2011 | Yoshida | B62D 21/11 |
| | | | 280/124.109 |
| 8,403,347 B2* | 3/2013 | Eickmann | B60G 21/0551 |
| | | | 180/312 |
| 9,016,424 B2* | 4/2015 | Awano | B62D 3/12 |
| | | | 180/274 |
| 9,102,356 B2* | 8/2015 | Awano | B62D 29/005 |
| 9,216,775 B2* | 12/2015 | Ohhama | B62D 21/11 |
| 9,394,002 B2* | 7/2016 | Uicker | B23K 20/129 |

* cited by examiner

STEERING APPARATUS FOR AUTOMOBILE

CROSS-REFERENCE TO RELATED APPLICATIONS

The present application claims priority to Korean Patent Application Number 10-2015-0071632 filed May 22, 2015, the entire contents of which the application is incorporated herein for all purposes by this reference.

TECHNICAL FIELD

The present invention relates to a steering apparatus for an automobile, and more particularly, to a steering apparatus for an automobile which moves tie rods coupled to knuckles and steers wheels.

BACKGROUND

In general, a steering apparatus, which is connected with knuckles disposed on left and right wheels and steers the left and right wheels, is installed in an automobile.

Figure 1:
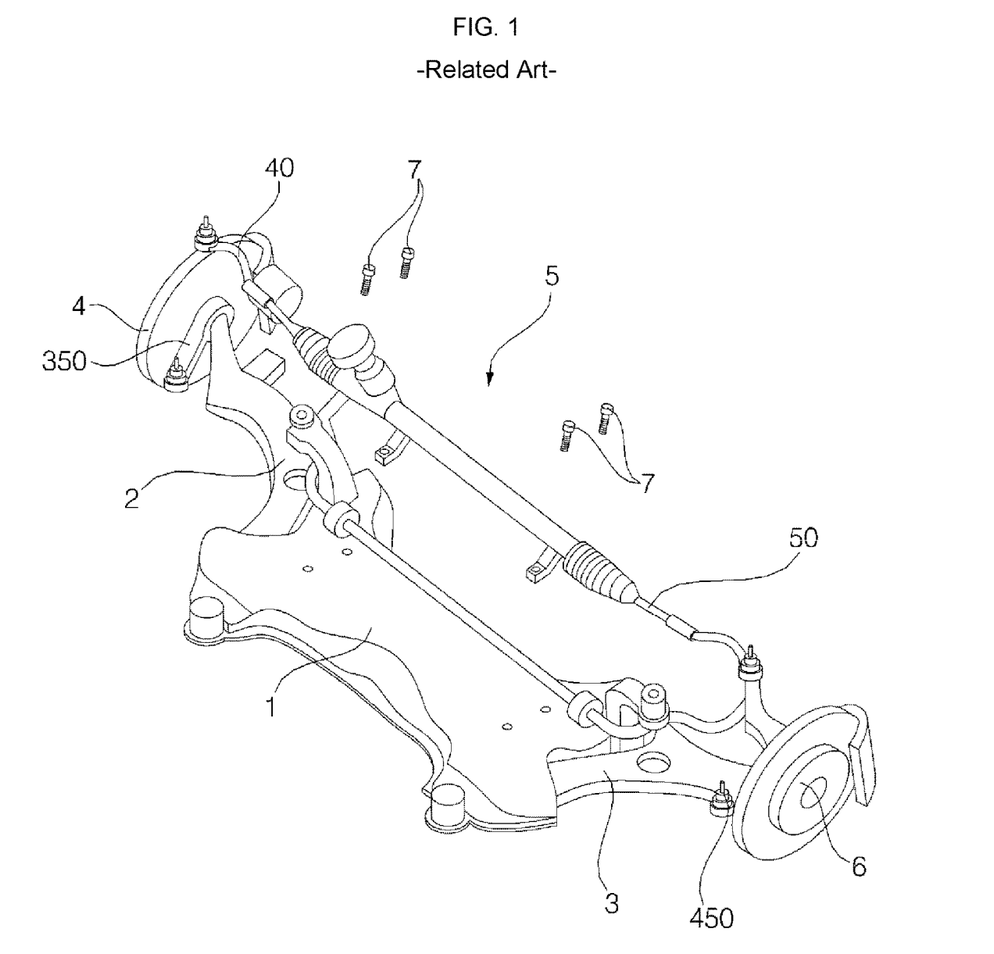
FIG. 1 is a perspective view illustrating a steering apparatus for an automobile in the related art.

FIG. 1 is a perspective view illustrating a steering apparatus for an automobile in the related art.

Referring to FIG. 1, a steering apparatus 5 for an automobile according to the related art is connected to knuckles 350 and 450 by means of tie rods 40 and 50 positioned at both ends, and adjusts leftward and rightward movement of axles 4 and 6, thereby enabling the automobile to be turned.

The steering apparatus 5 is mounted on a cross member 1 by bolting 7 at three points or four points. The cross member 1 is disposed to be elongated in left and right directions such that a left end is coupled to a left lower arm 2, and a right end is coupled to a right lower arm 3. Here, spring dampers for absorbing impact transmitted from a road surface to an automotive body through wheels are seated on and coupled to the left and right lower arms 2 and 3. That is, an upper end of the spring damper is connected to the automotive body, and a lower end of the spring damper is coupled to the lower arms 2 and 3, thereby absorbing shock when the automobile bumps.

Positions where the steering apparatus 5 is mounted on the cross member 1 are differently set in accordance with a shape or a structure of the steering apparatus 5, but generally, the positions are designed to be positioned at both ends of the steering apparatus 5 and at front and rear positions. Because performance of the steering apparatus 5 is dictated in accordance with the positions where the steering apparatus 5 is mounted on the cross member 1, detailed examination is required for the corresponding positions.

Because the currently applied cross member 1 is manufactured by a pressing process, the cross member 1 is thermally deformed due to welding. To maximally prevent shape distortion caused by the thermal deformation, various activities for managing quality are conducted, but it is difficult to implement a perfect shape. The positions where the steering apparatus 5 is mounted on the cross member 1 are vulnerable to the above described problem, such that forming may be applied to maximally reflect a designed shape, or a flat surface may be ensured by an additional process.

However, low mounting portion precision caused by a limitation of welding has an adverse effect on the steering apparatus 5, which is manufactured by high-precision processing, and consequently degrades performance. For example, in a case in which there is a difference in angle at a left surface of the left and right mounting portions, torsional force is applied to the steering apparatus 5 in a state in which the steering apparatus 5 is completely coupled to the cross member 1. The torsional force applied to the steering apparatus 5 affects the engagement between gears provided in the steering apparatus 5, thereby degrading steering performance because frictional force is increased when the steering apparatus 5 is operated.

SUMMARY

The present invention has been made in an effort to provide a steering apparatus for an automobile which improves steering performance.

Technical problems of the present invention are not limited to the aforementioned technical problem, and other technical problems, which are not mentioned above, may be clearly understood by those skilled in the art from the following descriptions.

An exemplary embodiment of the present invention provides a steering apparatus for an automobile including: a steering housing in which a steering drive unit, which moves a left tie rod and a right tie rod to the left and right sides, is disposed; a left mounting bracket which is coupled to a left side of the steering housing and coupled to a left lower arm; and a right mounting bracket which is coupled to a right side of the steering housing and coupled to a right lower arm.

Other detailed matters of the exemplary embodiment are included in the detailed description and the drawings.

In the steering apparatus for an automobile according to the present invention, the left and right sides of the steering housing are coupled to the lower arms by means of the mounting brackets, such that torsional force applied to the steering housing is reduced, and the steering drive unit disposed in the steering housing is smoothly operated.

In addition, since the steering housing includes the housing portion which surrounds the steering drive unit and the bracket portions which are coupled to the mounting brackets, such that the housing portion and the bracket portion are integrally formed, torsional force applied to the housing portion is reduced, and the steering drive unit disposed in the housing portion is smoothly operated.

The effects of the present invention are not limited to the aforementioned effects, and other effects, which are not mentioned above, will be clearly understood by those skilled in the art from the claims.

DETAILED DESCRIPTION

Advantages and features of the present invention and methods of achieving the advantages and features will be clear with reference to the exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a steering apparatus for an automobile according to an exemplary embodiment of the present invention will be described with reference to the drawings.

Figure 2:
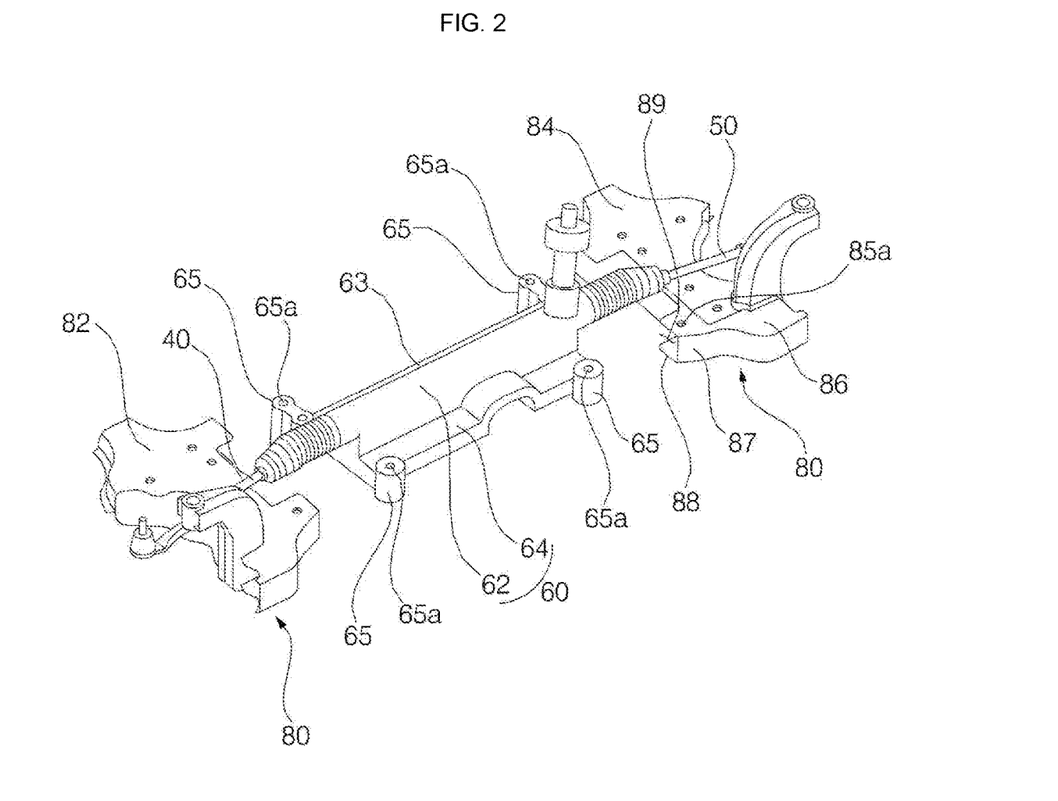
FIG. 2 is a perspective view illustrating a steering apparatus for an automobile according to an exemplary embodiment of the present invention.

FIG. 2 is a perspective view illustrating a steering apparatus for an automobile according to an exemplary embodiment of the present invention.

Referring to FIG. 2, the steering apparatus for an automobile according to the exemplary embodiment of the present invention includes a left tie rod 40, a right tie rod 50, a steering housing 60, a left mounting bracket 82, and a right mounting bracket 84.

The left tie rod 40 is connected with a knuckle 350 disposed on a left wheel 300, and the right tie rod 50 is connected with a knuckle 450 disposed on a right wheel 400.

The steering housing 60 includes a housing portion 62, and bracket portions 63 and 64 which protrude from the housing portion 62. The bracket portions 63 and 64 include a front bracket portion 63 which protrudes forward from the housing portion 62, and a rear bracket portion 64 which protrudes rearward from the housing portion 62. The housing portion 62, the front bracket portion 63, and the rear bracket portion 64 are made of aluminum. That is, the steering housing 60 is formed by aluminum casting, such that the steering housing 60 is manufactured so that the housing portion 62, the front bracket portion 63, and the rear bracket portion 64 are integrally formed.

The front bracket portion 63 and the rear bracket portion 64 of the steering housing 60, the left mounting bracket 82, and the right mounting bracket 84 correspond to a configuration in which a cross member 1 illustrated in FIG. 1 is divided into three pieces. All of the steering housing 60, the left mounting bracket 82, and the right mounting bracket 84 may be integrally formed by aluminum casting, but in this case, costs are increased, and thus only the steering housing 60 is formed by aluminum casting, and the left mounting bracket 82 and the right mounting bracket 84 are made of steel and formed by steel pressing.

The right side of the left mounting bracket 82 is coupled to the left side of the front bracket portion 63 and the left side of the rear bracket portion 64, and the left side of the left mounting bracket 82 is coupled to a left lower arm 2 illustrated in FIG. 1. The left side of the right mounting bracket 84 is coupled to the right side of the front bracket portion 63 and the right side of the rear bracket portion 64, and the right side of the right mounting bracket 84 is coupled to a right lower arm 3 illustrated in FIG. 1.

Coupling portions 65, which are inserted into and coupled to the left mounting bracket 82 and the right mounting bracket 84, are formed on the front bracket portion 63 and the rear bracket portion 64 so that the front bracket portion 63 and the rear bracket portion 64 are coupled to the left mounting bracket 82 and the right mounting bracket 84.

One coupling portion 65 protrudes forward at each of the left and right sides of the front bracket portion 43, and one coupling portion 65 protrudes rearward at each of the left and right sides of the rear bracket portion 64.

The coupling portion 65 is formed in a cylindrical shape having upper and lower flat surfaces, and a first coupling hole 65a, which vertically penetrates the coupling portion 65, is formed in the coupling portion 65.

The left mounting bracket 82 and the right mounting bracket 84 are formed to have the same size and shape. Hereinafter, for convenience of description, the left mounting bracket 82 and the right mounting bracket 84 are referred to as a mounting bracket 80.

The front and rear sides of the mounting bracket 80 are bent to have the same shape. That is, the front and rear sides of the mounting bracket 80 include an upper surface 86, lateral surfaces 87 which are formed to be bent downward from the upper surface 86, and a lower surface 88 which is formed to be bent inward from the lateral surfaces 87. The upper surface 86 and the lower surface 88 are spaced apart from each other so as to face each other, such that an internal space 89 into which the coupling portion 65 may be inserted is formed between the upper surface 86 and the lower surface 88.

In a state in which the coupling portion 65 is inserted into the internal space 89 between the upper surface 86 and the lower surface 88, an upper surface of the coupling portion 65 is in contact with the upper surface 86 of the mounting bracket 80, and a lower surface of the coupling portion 65 is in contact with the lower surface 88 of the mounting bracket 80.

Second coupling holes 85a, which correspond to the first coupling hole 65a formed in the coupling portion 65, are formed in the upper surface 86 which is in contact with the upper surface of the coupling portion 65, and the lower surface 88 which is in contact with the lower surface of the coupling portion 65, respectively.

While one first coupling hole 65a is formed in the coupling portion 65 formed on the rear bracket portion 64, two first coupling holes 65a are formed in the coupling portion 65 formed on the front bracket portion 63.

A coupling relationship between the steering housing 60 and the mounting bracket 80 will be described below with reference to FIGS. 8 to 12, and prior to the description, a steering drive unit 200, which is disposed in the housing portion 62 of the steering housing 60, will be described with reference to FIGS. 3 to 7.

Figure 3:
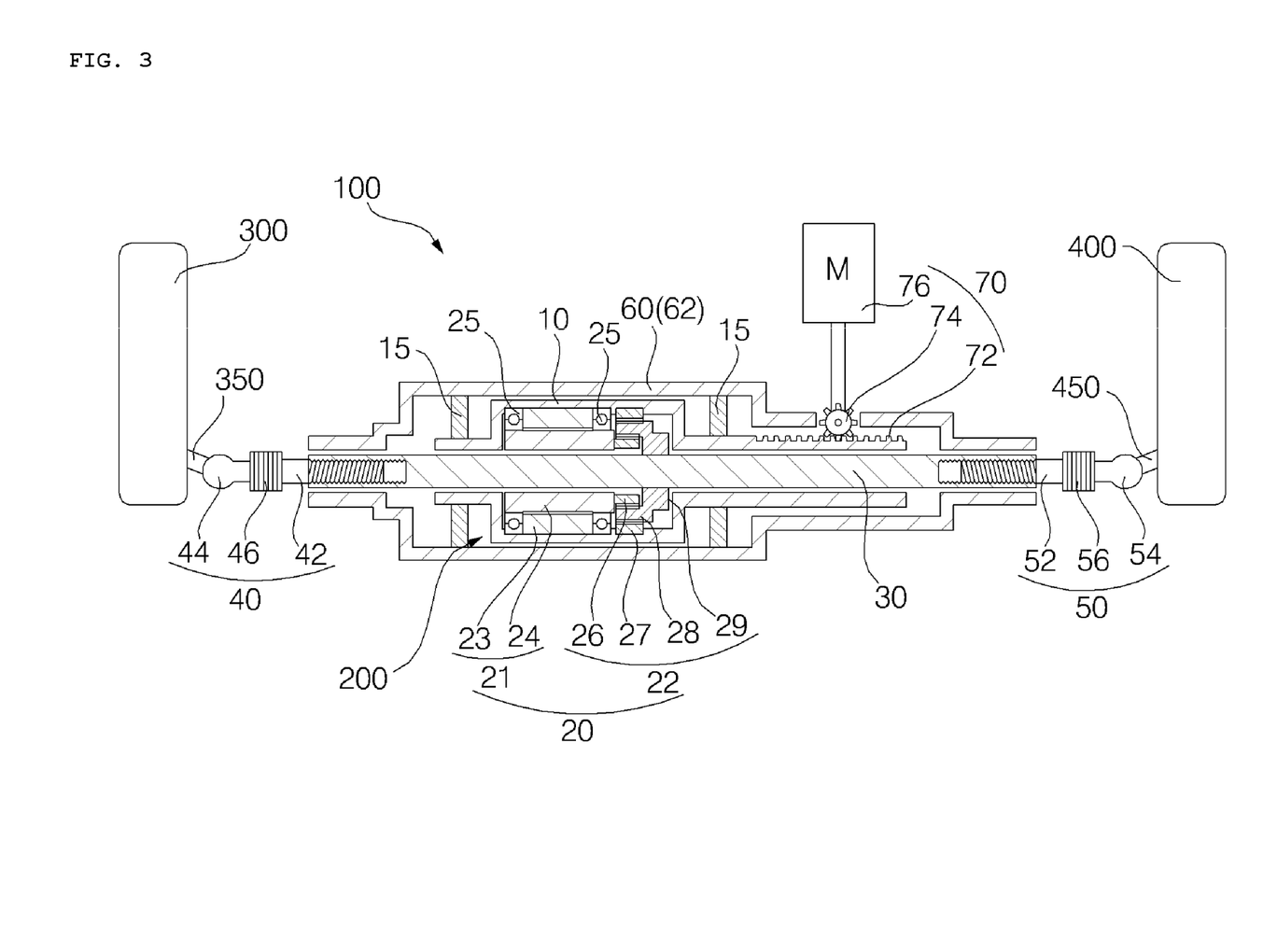
FIG. 3 is a cross-sectional view illustrating an interior of a steering housing illustrated in FIG. 2.
Figure 4:
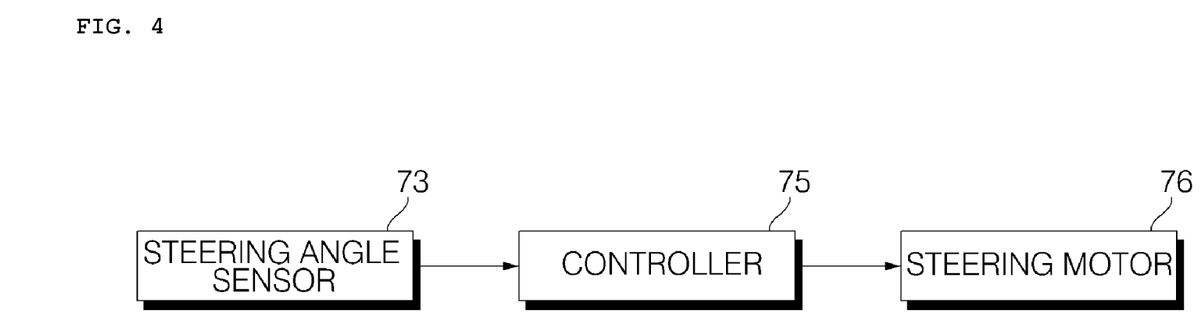
FIG. 4 is a control block diagram illustrating a configuration for controlling a steering motor included in the steering apparatus for an automobile according to the exemplary embodiment of the present invention.
Figure 5:
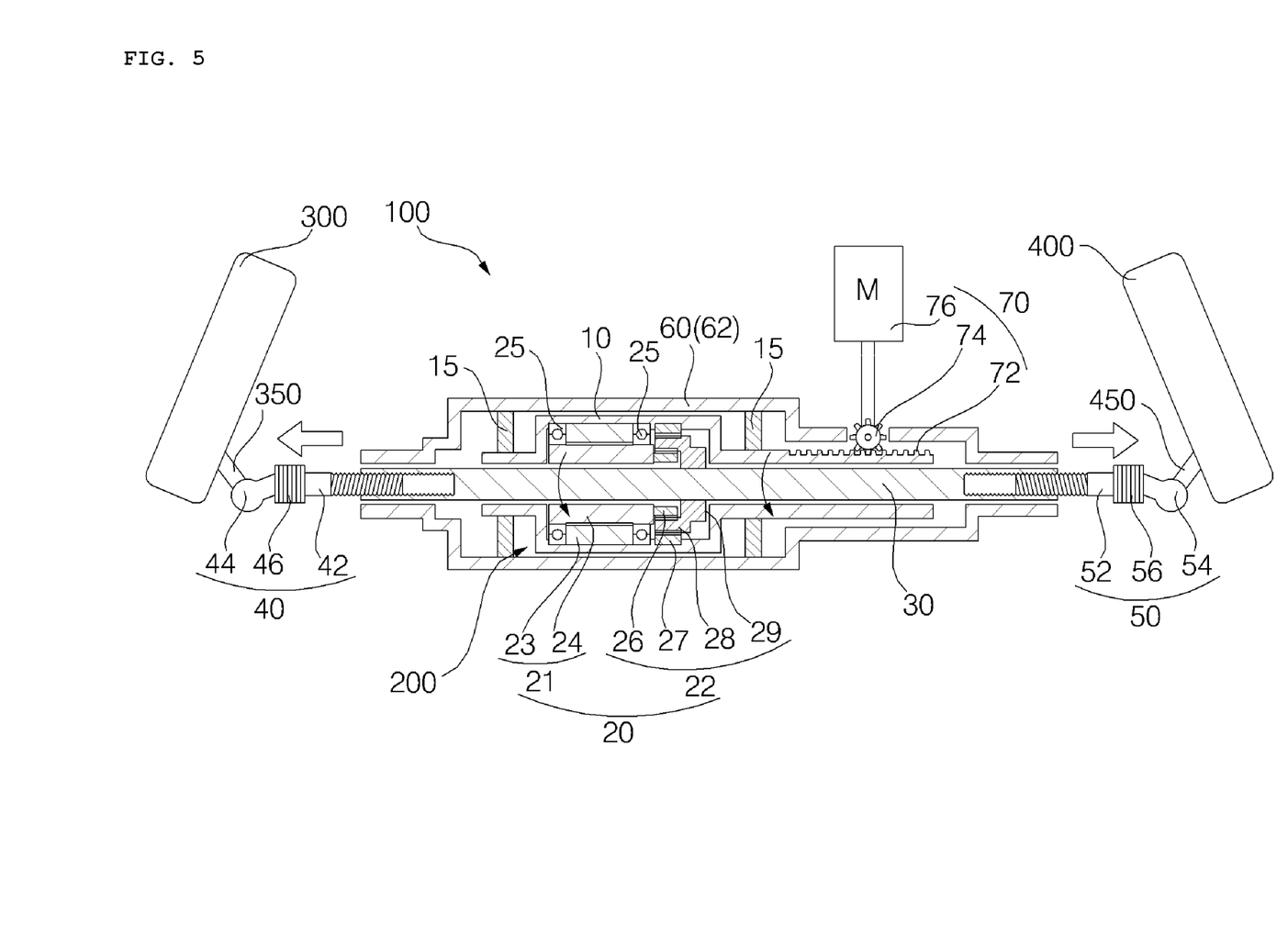
FIG. 5 is a view illustrating a state in which a pivot bar of the steering apparatus for an automobile according to the exemplary embodiment of the present invention is rotated.
Figure 6:
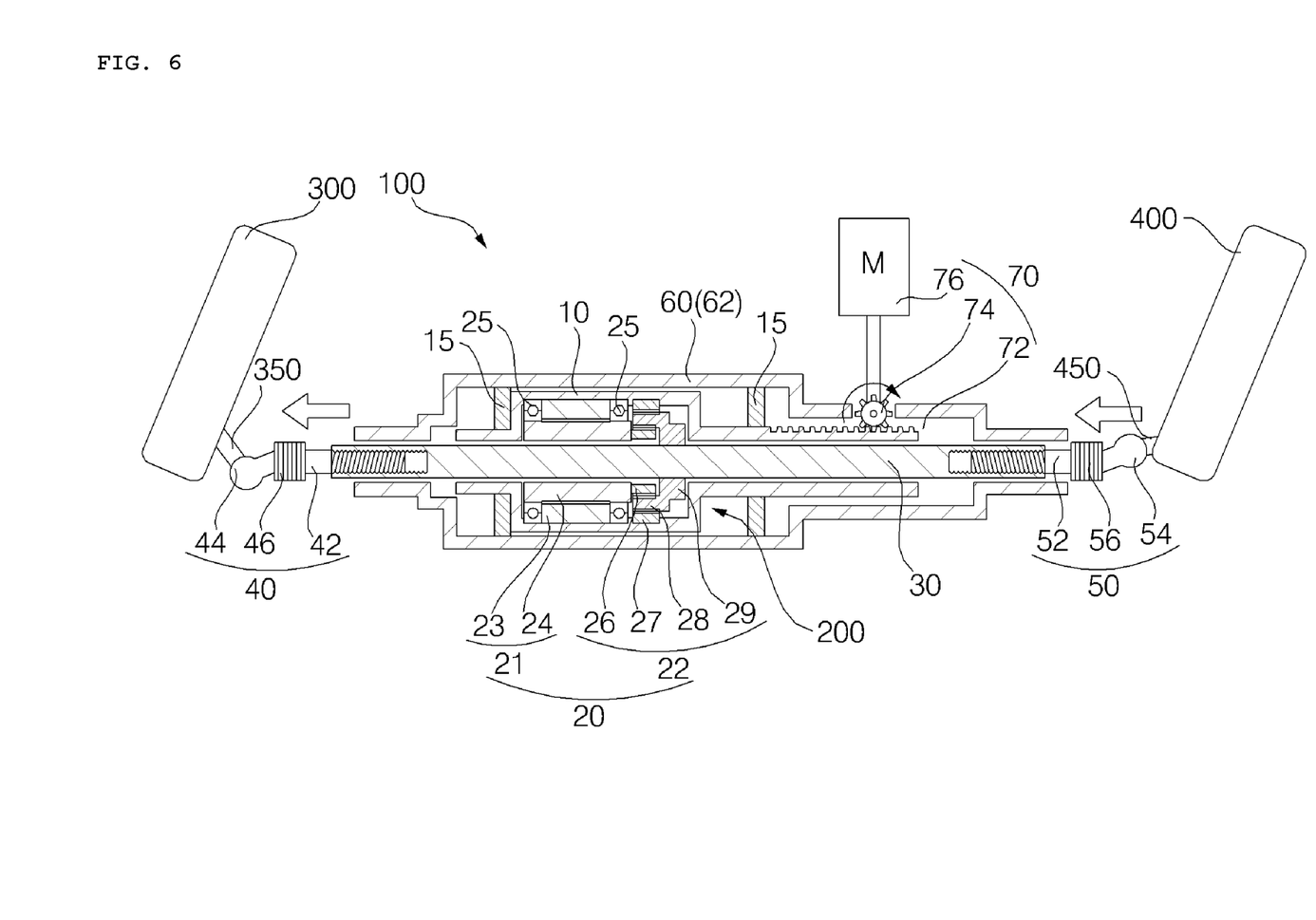
FIG. 6 is a view illustrating a state in which a pivot drive unit housing and the pivot bar of the steering apparatus for an automobile according to the exemplary embodiment of the present invention are moved to the left side.
Figure 7:
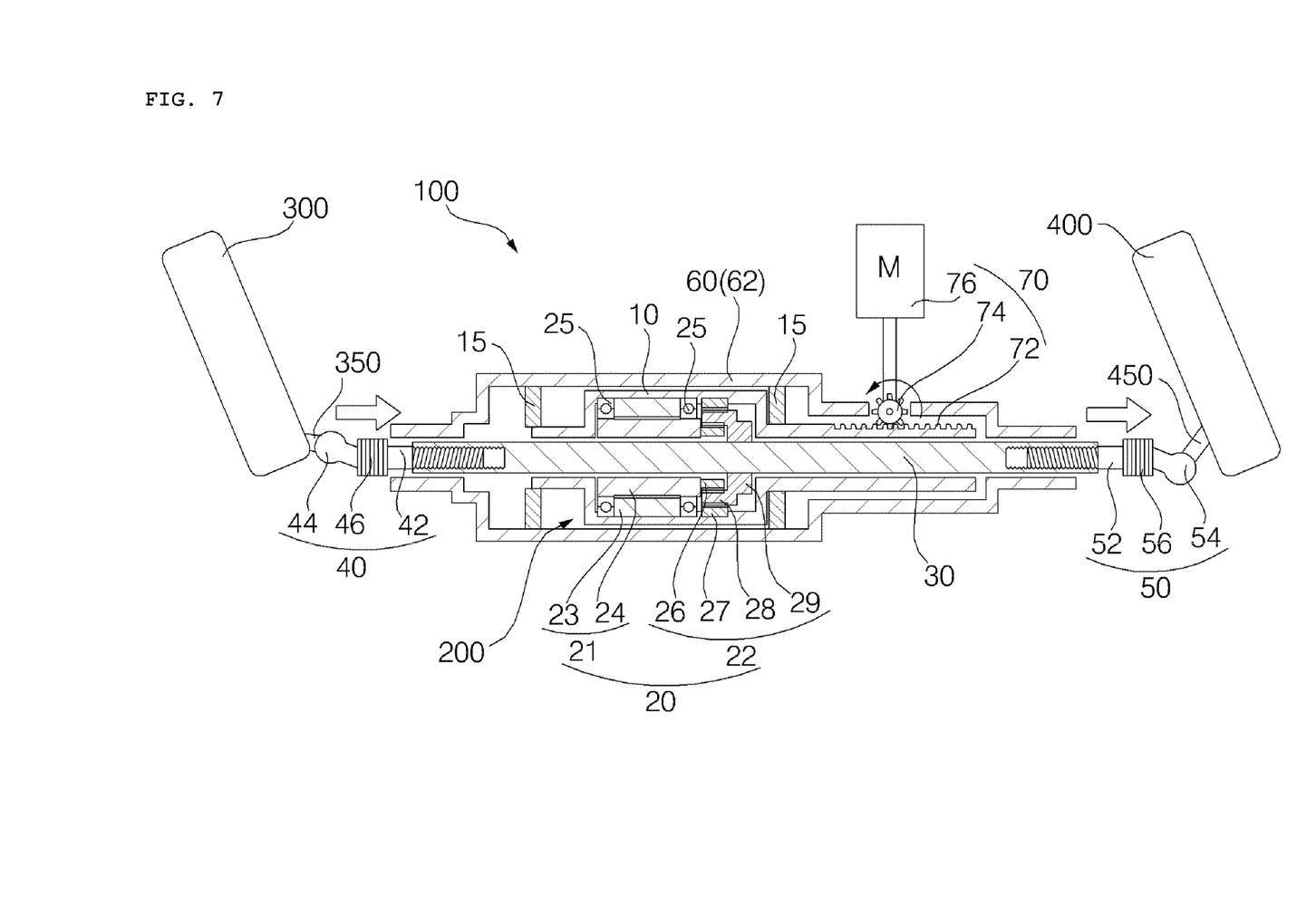
FIG. 7 is a view illustrating a state in which the pivot drive unit housing and the pivot bar of the steering apparatus for an automobile according to the exemplary embodiment of the present invention are moved to the right side.

FIG. 3 is a cross-sectional view illustrating an interior of the steering housing illustrated in FIG. 2, FIG. 4 is a control block diagram illustrating a configuration for controlling a steering motor included in the steering apparatus for an automobile according to the exemplary embodiment of the present invention, FIG. 5 is a view illustrating a state in which a pivot bar of the steering apparatus for an automobile according to the exemplary embodiment of the present invention is rotated, FIG. 6 is a view illustrating a state in which a pivot drive unit housing and the pivot bar of the steering apparatus for an automobile according to the exemplary embodiment of the present invention are moved to the left side, and FIG. 7 is a view illustrating a state in which the pivot drive unit housing and the pivot bar of the steering apparatus for an automobile according to the exemplary embodiment of the present invention are moved to the right side. Here, the steering drive unit 200 serves to steer the left and right wheels 300 and 400 by moving the left tie rod 40 and the right tie rod 50 to the left and right sides, and the steering drive unit 200 illustrated in FIGS. 3 to 7 is illustrated as an example for explaining the operability of the steering apparatus for an automobile according to the exemplary embodiment of the present invention, and the steering drive unit need not be necessarily configured as illustrated in FIGS. 3 to 7.

Referring to FIGS. 3 to 7, in the steering apparatus 100 for an automobile according to the exemplary embodiment of the present invention, the steering drive unit 200, which moves the left tie rod 40 and the right tie rod 50 to the left and right sides, is disposed in the housing portion 62 of the steering housing 60. That is, the housing portion 62 surrounds the steering drive unit 200.

The steering drive unit 200 includes a pivot drive unit housing 10, a pivot drive unit 20 which is disposed in the pivot drive unit housing 10, and a pivot bar 30 which is rotated by driving power of the pivot drive unit 20.

A right end of the left tie rod 40 is screw-coupled to a left end of the pivot bar 30, and a left end of the left tie rod 40 is link-coupled to the knuckle 350 disposed on the left wheel 300, such that the left tie rod 40 moves to the left and right sides depending on a rotation direction of the pivot bar 30. A left end of the right tie rod 50 is screw-coupled to a right end of the pivot bar 30, and a right end of the right tie rod 50 is link-coupled to the knuckle 450 disposed on the right wheel 400, such that the right tie rod 50 moves to the left and right sides depending on the rotation direction of the pivot bar 30.

In detail, screw threads are formed on an outer circumferential surface of the right end of the left tie rod 40, and screw threads are formed on an inner circumferential surface of the left end of the pivot bar 30, such that the right end of the left tie rod 40 is screw-coupled to the inside of the left end of the pivot bar 30. Of course, if the right end of the left tie rod 40 has a greater diameter and a hollow structure, screw threads are formed on an inner circumferential surface of the right end of the left tie rod 40, and screw threads are formed on an outer circumferential surface of the left end of the pivot bar 30, such that the left end of the pivot bar 30 may be screw-coupled to the inside of the right end of the left tie rod 40.

Screw threads are formed on an outer circumferential surface of the left end of the right tie rod 50, and screw threads are formed on an inner circumferential surface of the right end of the pivot bar 30, such that the left end of the right tie rod 50 is screw-coupled to the inside of the right end of the pivot bar 30. Of course, if the left end of the right tie rod 50 has a larger diameter and a hollow structure, screw threads are formed on an inner circumferential surface of the left end of the right tie rod 50, and screw threads are formed on an outer circumferential surface of the right end of the pivot bar 30, such that the right end of the pivot bar 30 may be screw-coupled to the inside of the left end of the right tie rod 50.

The screw threads, which are formed at the left end of the pivot bar 30, and the screw threads, which are formed at the right end of the pivot bar 30, are formed in the opposite directions. In addition, the screw threads, which are formed at the right end of the left tie rod 40, and the screw threads, which are formed at the left end of the right tie rod 50, are formed in the opposite directions. Therefore, when the pivot bar 30 is rotated, the left tie rod 40 and the right tie rod 50 moved in the opposite directions. That is, when the pivot bar 30 rotates in one direction, the left tie rod 40 and the right tie rod 50 are together withdrawn from the pivot bar 30, and when the pivot bar 30 rotates in the opposite direction, the left tie rod 40 and the right tie rod 50 are together inserted into the pivot bar 30.

The pivot bar 30 penetrates the pivot drive unit housing 10 and the pivot drive unit 20, such that both ends of the pivot bar 30 are disposed outside the pivot drive unit housing 10.

The pivot drive unit 20 includes a motor unit 21 which generates driving power, and a speed reduction unit 22 which reduces a rotational speed of the motor unit 21 and rotates the pivot bar 30.

The motor unit 21 includes a stator 23 which is fixed in the pivot drive unit housing 10, and a rotor 24 which is rotatably disposed in the stator 23 and rotates the speed reduction unit 22. The rotor 24 is rotatably coupled in the pivot drive unit housing 10 by means of bearings 25. Four bearings 25 are provided such that the two bearings 25 support the left side of the rotor 25, and the remaining two bearings 25 support the right side of the rotor 25. The pivot bar 30 penetrates a central portion of the rotor 24 so as to be spaced apart from the central portion of the rotor 24.

The speed reduction unit 22 reduces a rotational speed of the rotor 24, and amplifies driving power for rotating the pivot bar 30. The speed reduction unit 22 includes a sun gear 26 which is coupled to the rotor 24 and rotated together with the rotor 24, a ring gear 27 which has an inner side spaced apart from the sun gear 26, and an outer side fixed to the pivot drive unit housing 10, pinion gears 28 which are engaged with the sun gear 26 and the ring gear 27 and rotated, and a carrier 29 which is engaged with the pinion gears 28 and rotated, and has a central portion which the pivot bar 30 penetrates.

The pivot bar 30 penetrates a central portion of the sun gear 26 so as to be spaced apart from the central portion of the sun gear 26, and a circumferential surface of the pivot bar 30 is fixed to the central portion of the carrier 29. Therefore, when the rotor 24 rotates, the pivot bar 30 also rotates.

An outer circumferential surface of the ring gear 27 is fixed to an inner circumferential surface of the pivot drive unit housing 10, and the pinion gear 28 is disposed between the sun gear 26 and the ring gear 27. A plurality of pinion gears 28 may be provided around the sun gear 26.

The left tie rod 40 includes a rod 42 and a link member 44. The rod 42 is screw-coupled to the pivot bar 30, and moves to the left and right sides depending on the rotation direction of the pivot bar 30. One end of the link member 44 is rotatably coupled to the rod 42, and the other end of the link member 44 is rotatably coupled to the knuckle 350.

In the present exemplary embodiment, the left tie rod 40 further includes bellows 46 which rotatably couple one end of the link member 44 to the rod 42. The bellows 46 may vary in length and be rotated.

The right tie rod 50 has the same configuration as the left tie rod 40. That is, the right tie rod 50 includes a rod 52 and a link member 54. The rod 52 is screw-coupled to the pivot bar 30, and moves to the left and right sides depending on the rotation direction of the pivot bar 30. One end of the link member 54 is rotatably coupled to the rod 52, and the other end of the link member 54 is rotatably coupled to the knuckle 450.

In the present exemplary embodiment, the right tie rod 50 further includes bellows 56 which rotatably couple one end of the link member 54 to the rod 52. The bellows 56 may vary in length and be rotated.

The knuckle 350 disposed on the left wheel 300 is coupled to the left wheel 300 in a state in which the knuckle 350 is spaced apart toward one side from a center of the left wheel 300, and the knuckle 450 disposed on the right wheel 400 is coupled to the right wheel 400 in a state in which the knuckle 450 is spaced apart toward one side from a center of the right wheel 300. In FIG. 3, the knuckle 350 disposed on the left wheel 300 is coupled to the left wheel 300 in a state in which the knuckle 350 is spaced apart toward the rear side from a center of the left wheel 300, and the knuckle 450 disposed on the right wheel 400 is coupled to the right wheel 400 in a state in which the knuckle 450 is spaced apart toward the rear side from a center of the right wheel 400. Therefore, when the left tie rod 40 moves to the left side and the right tie rod 50 moves to the right side in a state illustrated in FIG. 3, the front side of the left wheel 300 is directed toward the right side, and the front side of the right wheel 400 is directed toward the left side as illustrated in FIG. 5. In this state, if the left tie rod 40 further moves to the left side, and the right tie rod 50 further moves to the right side, the directions of the left and right wheels 300 and 400 may be changed by 90 degrees.

The pivot drive unit housing 10 and the pivot bar 30 are disposed in the housing portion 62 of the steering housing 60 so as to be movable to the left and right sides.

Sliding bearings 15 are disposed in the housing portion 62 so as to be movable to the left and right sides. Two sliding bearings 15 are provided such that one sliding bearing 15 is disposed to be spaced apart from the left side of the pivot drive unit housing 10, the other sliding bearing 15 is disposed to be spaced apart from the right side of the pivot drive unit housing 10, and the sliding bearings 15 assist the pivot drive unit housing 10 in smoothly moving to the left and right sides.

Referring to FIG. 6, when the pivot drive unit housing 10 and the pivot bar 30 move to the left side inside the housing portion 62, the left end of the pivot bar 30 protrudes to the left side of the housing portion 62, and both front sides of the left and right wheels 300 and 400 are directed toward the right side.

In addition, referring to FIG. 7, when the pivot drive unit housing 10 and the pivot bar 30 move to the right side inside the housing portion 62, the right end of the pivot bar 30 protrudes to the right side of the housing portion 62, and both of the front sides of the left and right wheels 300 and 400 are directed toward the left side.

The steering apparatus 100 for an automobile according to the exemplary embodiment of the present invention further includes a steering means 70 which moves the pivot drive unit housing 10 and the pivot bar 30 to the left and right sides.

The steering means 70 includes a rack gear 72 which is coupled to an outer surface of the pivot drive unit housing 10, a pinion gear 74 which is engaged with the rack gear 72, and a steering motor 76 which rotates the pinion gear 74.

As illustrated in FIG. 4, the steering motor 76 is operated in accordance with a steering angle of a steering wheel (not illustrated), and moves the pivot drive unit housing 10 and the pivot bar 30 to the left and right sides. That is, when a driver rotates the steering wheel to the left side or the right side, a steering angle sensor 73 detects a change in steering angle of the steering wheel, and a controller 75 controls a rotation angle of the steering motor 76 in accordance with the change in steering angle inputted from the steering angle sensor 73, such that the pinion gear 74 may be rotated, and thus the pivot drive unit housing 10 and the pivot bar 30 may be moved to the left and right sides.

The steering means 70 need not necessarily include the rack gear 72, the pinion gear 74, and the steering motor 76. Another example of the steering means 70 will be simply described. A hydraulic pump, which is controlled by the controller 75, is used instead of the steering motor 76, and a hydraulic cylinder apparatus, which is operated by the hydraulic pump, is used instead of the rack gear 72 and the pinion gear 74, such that a cylinder of the hydraulic cylinder apparatus is coupled in the housing portion 62, and a rod of the hydraulic cylinder apparatus is coupled to the pivot drive unit housing 10, so that even though the rod is withdrawn from or inserted into the cylinder by hydraulic pressure of the hydraulic pump, the pivot drive unit housing 10 and the pivot bar 30 may be moved to the left and right sides.

Figure 8:
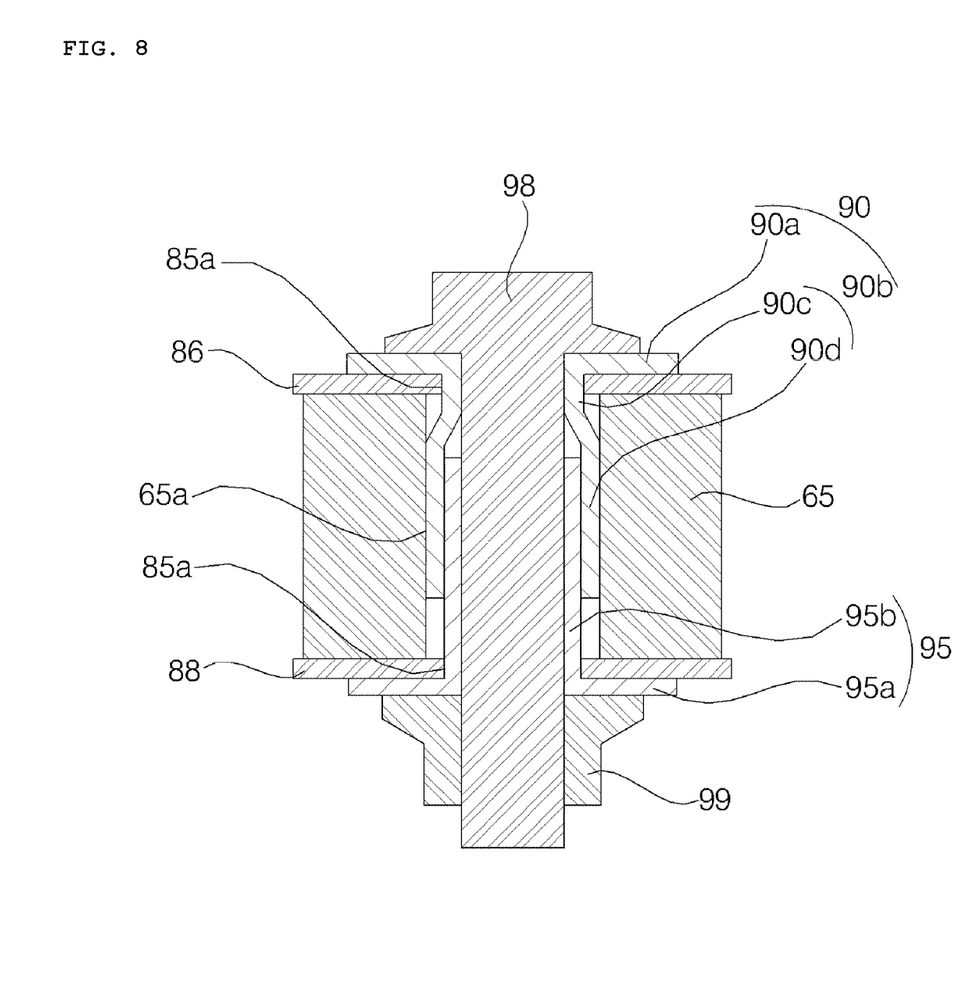
FIG. 8 is a cross-sectional view illustrating a coupling relationship between a steering housing and left and right mounting brackets illustrated in FIG. 2.
Figure 9:
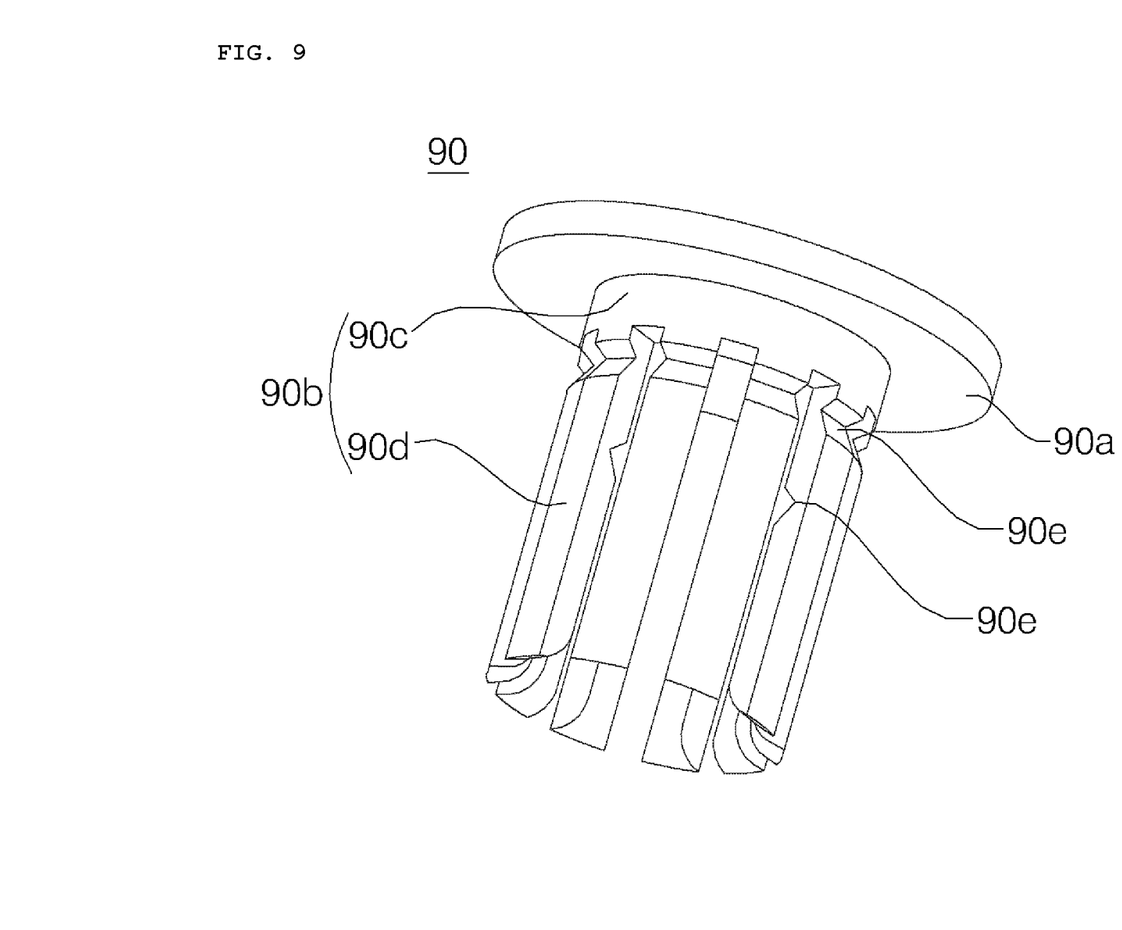
FIG. 9 is a perspective view illustrating a first retainer illustrated in FIG. 8.
Figure 10:
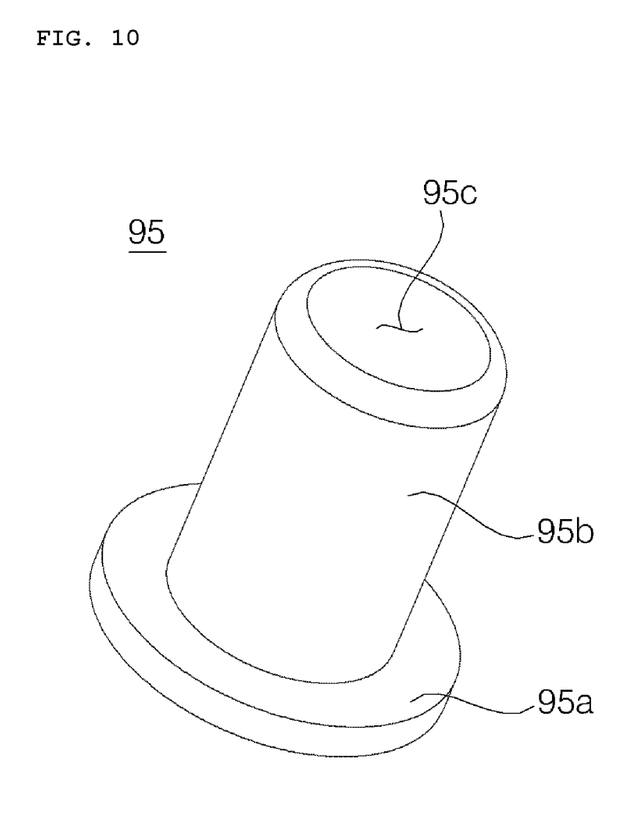
FIG. 10 is a perspective view illustrating a second retainer illustrated in FIG. 8.
Figure 11:
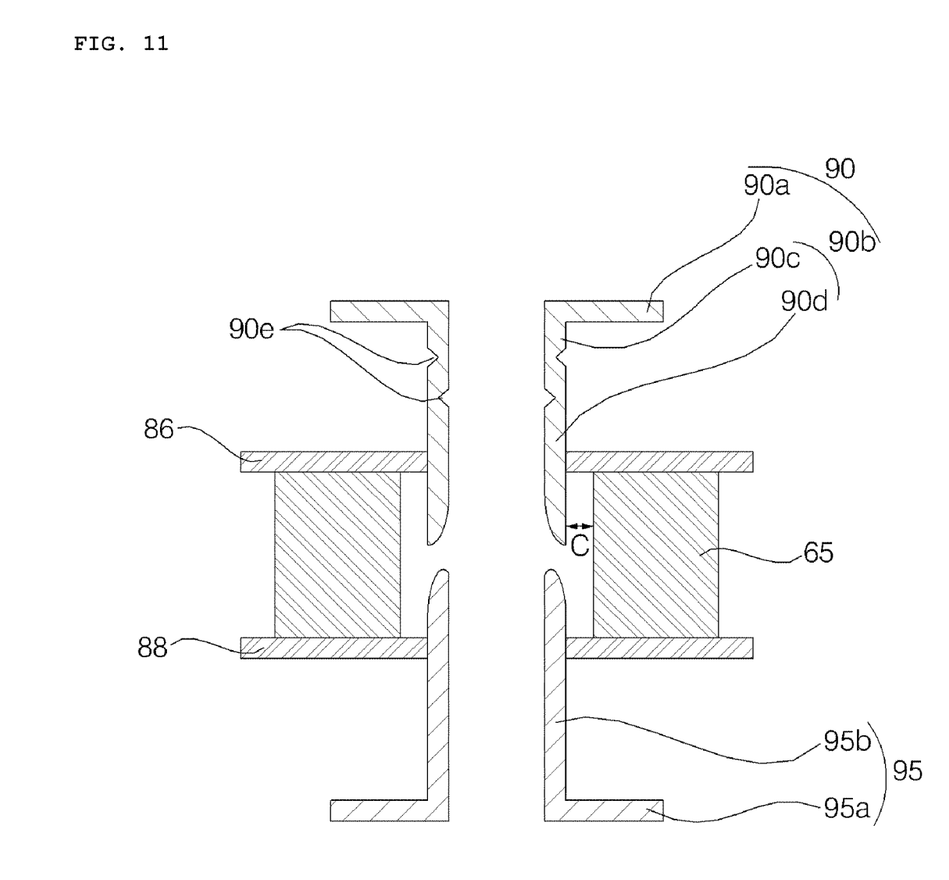
FIG. 11 is a cross-sectional view illustrating a state before the second retainer is inserted into the first retainer.
Figure 12:
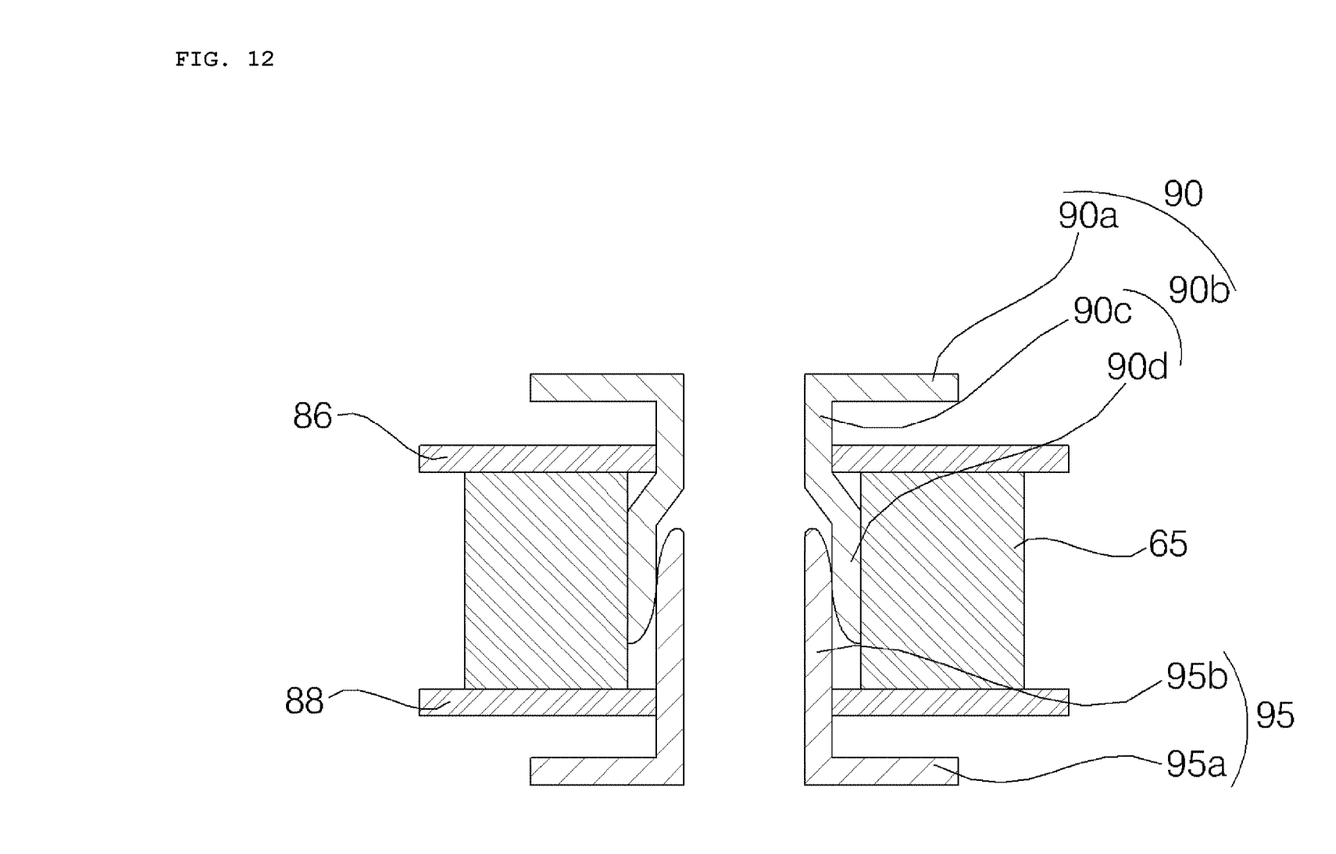
FIG. 12 is a cross-sectional view illustrating a state after the second retainer is inserted into the first retainer.

FIG. 8 is a cross-sectional view illustrating a coupling relationship between the steering housing and the left and right mounting brackets illustrated in FIG. 2, FIG. 9 is a perspective view illustrating a first retainer illustrated in FIG. 8, FIG. 10 is a perspective view illustrating a second retainer illustrated in FIG. 8, FIG. 11 is a cross-sectional view illustrating a state before the second retainer is inserted into the first retainer, and FIG. 12 is a cross-sectional view illustrating a state after the second retainer is inserted into the first retainer.

Referring to FIGS. 8 to 12, the coupling portion 65 formed on the bracket portion 64 of the steering housing 60 is inserted between the upper surface 86 and the lower surface 88 of the mounting bracket 80, and then coupled by means of fastening members 98 and 99. The fastening members 98 and 99 may include a bolt 98, and a nut 99 fastened to the bolt 98. The bolt 98 penetrates the first coupling hole 65*a* formed in the coupling portion 65 and the second coupling hole 85*a* formed in the upper surface 86 of the mounting bracket 80, such that a head portion is disposed on the upper surface 86 of the mounting bracket 80, and a tip portion penetrates the second coupling hole 85*a* formed in the lower surface 88 of the mounting bracket 80 and protrudes to the lower side of the lower surface 88 such that the tip portion, which protrudes to the lower side of the lower surface 88 of the mounting bracket 80 is coupled to the nut 99, and as a result, the fastening members 98 and 99 may couple the coupling portion 65 and the mounting bracket 80.

The steering apparatus for an automobile according to the exemplary embodiment of the present invention further includes retainers 90 and 95. The retainers 90 and 95 are inserted into the first coupling hole 65*a* formed in the coupling portion 65 and the second coupling holes 85*a* formed in the upper surface 86 and the lower surface 88. In addition, the fastening member 98 is inserted into the retainers 90 and 95.

The retainers 90 and 95 are inserted into the second coupling hole 85*a* formed in the upper surface 86 of the mounting bracket 80, and then inserted into the first coupling hole 65*a* formed in the first coupling portion 65. In a state in which the retainers 90 and 95 are sequentially inserted into the second coupling hole 85a and the first coupling hole 65a, the fastening member 98 is inserted into the retainers 90 and 95.

The retainers 90 and 95 include a first retainer 90 and a second retainer 95. The first retainer 90 passes through the second coupling hole 85a formed in the upper surface 86 from the upper side of the mounting bracket 80, and is inserted into the first coupling hole 65a formed in the coupling portion 65. The second retainer 95 passes through the second coupling hole 85a formed in the lower surface 88 from the lower side of the mounting bracket 80, and is inserted into the first coupling hole 65a formed in the coupling portion 65.

The second retainer 95 is inserted into the first retainer 90 inside the first coupling hole 65a.

The first retainer 90 includes a first head portion 90a and a first insertion portion 90b. The first head portion 90a is in contact with an outer surface of the upper surface 86. The first insertion portion 90b protrudes from a lower side of the first head portion 90a, and is inserted into the second coupling hole 85a formed in the upper surface 86 and the first coupling hole 65a formed in the coupling portion 65.

The second retainer 95 includes a second head portion 95a and a second insertion portion 95b. The second head portion 95a is in contact with an outer surface of the lower surface 86. The second insertion portion 95b protrudes from an upper side of the second head portion 95a, and is inserted into the second coupling hole 85a formed in the lower surface 88 and the first coupling hole 65a formed in the coupling portion 65. The second insertion portion 95b is formed to have an annular cross section, and has therein a hollow space 95c.

The first insertion portion 90b may be formed to have the same shape as the second insertion portion 95b. In this case, an inner diameter of the first insertion portion 90b is larger than an outer diameter of the second insertion portion 95b, such that the second insertion portion 95b may be inserted into the first insertion portion 90b. However, in a case in which the first insertion portion 90b is formed to have the same shape as the second insertion portion 95b, a gap C is present between an outer side of the first insertion portion 90b and an inner side of the coupling portion 65 in a state in which the first insertion portion 90b is inserted into the first coupling hole 65a formed in the coupling portion 65, and as a result, there is concern that the steering housing 60 and the mounting bracket 80 will move. To prevent the movement of the steering housing 60 and the mounting bracket 80, the outer side of the first insertion portion 90b may be in close contact with the inner side of the coupling portion 65 so that no gap C is present between the outer side of the first insertion portion 90b and the inner side of the coupling portion 65 in a state in which the first insertion portion 90b is inserted into the first coupling hole 65a formed in the coupling portion 65.

The first insertion portion 90b is formed to have a special shape so that the outer side of the first insertion portion 90b may be in close contact with the inner side of the coupling portion 65 in a state in which the first insertion portion 90b is inserted into the first coupling hole 65a formed in the coupling portion 65. That is, the first insertion portion 90b includes a base portion 90c which protrudes from a lower side of the first head portion 90a, and a plurality of rib portions 90d which protrudes from a lower side of the base portion 90c.

The base portion 90c is formed to have an annular shape, and has therein a hollow space. Further, the rib portions 90d are portions into which a tip portion of the second insertion portion 95b of the second retainer 95 is inserted, and the rib portions 90d are elongated downward so that the tip portion of the second insertion portion 95b may be inserted, and a plurality of rib portions 90d is formed in a circumferential direction at the lower side of the base portion 90c. Since the plurality of rib portions 90d is formed in a circumferential direction at the lower side of the base portion 90c, an interior formed by the plurality of rib portions 90d has a space into which the second insertion portion 95b may be inserted, and the space formed by the plurality of rib portions 90d is smaller than an outer diameter of the second insertion portion 95b, such that when the second insertion portion 95b is inserted into the space formed by the plurality of rib portions 90d, the plurality of rib portions 90d is spread.

Groove portions 90e, which are spaced apart in an insertion direction, are formed at inner and outer sides of the plurality of rib portions 90d, respectively, and when the second insertion portion 95b is inserted between the plurality of rib portions 90d, the plurality of rib portions 90d is bent based on the groove portion 90e while being spread outward, and thus comes into close contact with the inner side of the coupling portion 65, such that no gap C is present, and as a result, the steering housing 60 does not move in a state in which the steering housing 60 is coupled to the mounting bracket 80.

As described above, in the steering apparatus for an automobile according to the present invention, the left and right sides of the steering housing 60 are coupled to the lower arms 2 and 3 by means of the mounting brackets 80, such that torsional force applied to the steering housing 60 is reduced, and the steering drive unit 200 disposed in the steering housing 60 is smoothly operated.

In addition, since the steering housing 60 includes the housing portion 62 which surrounds the steering drive unit 200 and the bracket portions 63 and 64 which are coupled to the mounting brackets 80, such that the housing portion 62 and the bracket portion 64 are integrally formed, torsional force applied to the housing portion 62 is reduced, and the steering drive unit 200 disposed in the housing portion 62 is smoothly operated.

It may be understood by a person skilled in the art that the present invention may be carried out in other specific forms without changing the technical spirit or the essential characteristics of the present invention. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A steering apparatus for an automobile, comprising:
a steering housing in which a steering drive unit, which moves a left tie rod and a right tie rod to the left and right sides, is disposed;
a left mounting bracket which is separate from the steering housing, coupled to a left side of the steering housing by means of a first fastening member, and coupled to a left lower arm; and
a right mounting bracket which is separate from the steering housing and the left mounting bracket, coupled to a right side of the steering housing by means of a second fastening member, and coupled to a right lower arm, wherein the steering housing includes:
- a housing portion which surrounds the steering drive unit;
- a front bracket portion which protrudes forward from the housing portion so as to be formed integrally with the housing portion, and is coupled to the left mounting bracket and the right mounting bracket; and
- a rear bracket portion which protrudes rearward from the housing portion so as to be formed integrally with the housing portion, and is coupled to the left mounting bracket and the right mounting bracket.

2. The steering apparatus of claim 1, wherein each of the left mounting bracket and the right mounting bracket includes:
- an upper surface;
- lateral surfaces which are formed to be bent downward from the upper surface; and
- a lower surface which is formed to be bent inward from the lateral surfaces, and disposed to be spaced apart from the upper surface so as to face the upper surface.

3. A steering apparatus for an automobile, comprising:
- a steering housing in which a steering drive unit, which moves a left tie rod and a right tie rod to the left and right sides, is disposed;
- a left mounting bracket which is coupled to a left side of the steering housing and coupled to a left lower arm; and
- a right mounting bracket which is coupled to a right side of the steering housing and coupled to a right lower arm, wherein the steering housing includes:
- a housing portion which surrounds the steering drive unit;
- a front bracket portion which protrudes forward from the housing portion so as to be formed integrally with the housing portion, and is coupled to the left mounting bracket and the right mounting bracket; and
- a rear bracket portion which protrudes rearward from the housing portion so as to be formed integrally with the housing portion, and is coupled to the left mounting bracket and the right mounting bracket, wherein each of the left mounting bracket and the right mounting bracket includes:
- an upper surface;
- lateral surfaces which are formed to be bent downward from the upper surface; and
- a lower surface which is formed to be bent inward from the lateral surfaces, and disposed to be spaced apart from the upper surface so as to face the upper surface, wherein coupling portions, each of which is inserted and coupled between the upper surface and the lower surface, are formed on the front bracket portion and the rear bracket portion.

4. The steering apparatus of claim 3, wherein a first coupling hole, which vertically penetrates each coupling portion, is formed in each coupling portion, a second coupling hole corresponding to the first coupling hole, is formed in the upper surface of each mounting bracket and the lower surface of each mounting bracket, and the steering apparatus further includes a fastening member which is fastened by penetrating the first coupling hole and the second coupling hole.

5. The steering apparatus of claim 4, wherein the first coupling hole is formed in plural in each coupling portion formed on the front bracket portion.

6. The steering apparatus of claim 4, further comprising:
- a retainer which is inserted into the first coupling hole and the second coupling hole and into which the fastening member is inserted.

7. The steering apparatus of claim 6, wherein the retainer includes:
- a first retainer which is inserted into the first coupling hole through the second coupling hole formed in the upper surface of each mounting bracket; and
- a second retainer which is inserted into the first coupling hole through the second coupling hole formed in the lower surface of each mounting bracket.

8. The steering apparatus of claim 7, wherein the second retainer is inserted into the first retainer inside the first coupling hole.

9. The steering apparatus of claim 7, wherein the first retainer includes a first head portion which is in contact with an outer surface of the upper surface of each mounting bracket, and a first insertion portion which protrudes from the first head portion and is inserted into the second coupling hole formed in the upper surface of each mounting bracket and the first coupling hole formed in the coupling portion, and the second retainer includes a second head portion which is in contact with an outer surface of the lower surface of each mounting bracket, and a second insertion portion which protrudes from the second head portion and is inserted into the second coupling hole formed in the lower surface of each mounting bracket and the first coupling hole formed in the coupling portion.

10. The steering apparatus of claim 9, wherein the first insertion portion includes:
- a base portion which protrudes from the first head portion; and
- a plurality of rib portions which protrudes from the base portion.

11. The steering apparatus of claim 10, wherein groove portions, which are spaced apart in an insertion direction, are formed at inner and outer sides of the plurality of rib portions, and the plurality of rib portions is bent based on the groove portions when the second insertion portion is inserted between the plurality of rib portions, such that the plurality of rib portions is in close contact with an inner side of the coupling portion.

* * * * *